Patented May 4, 1943

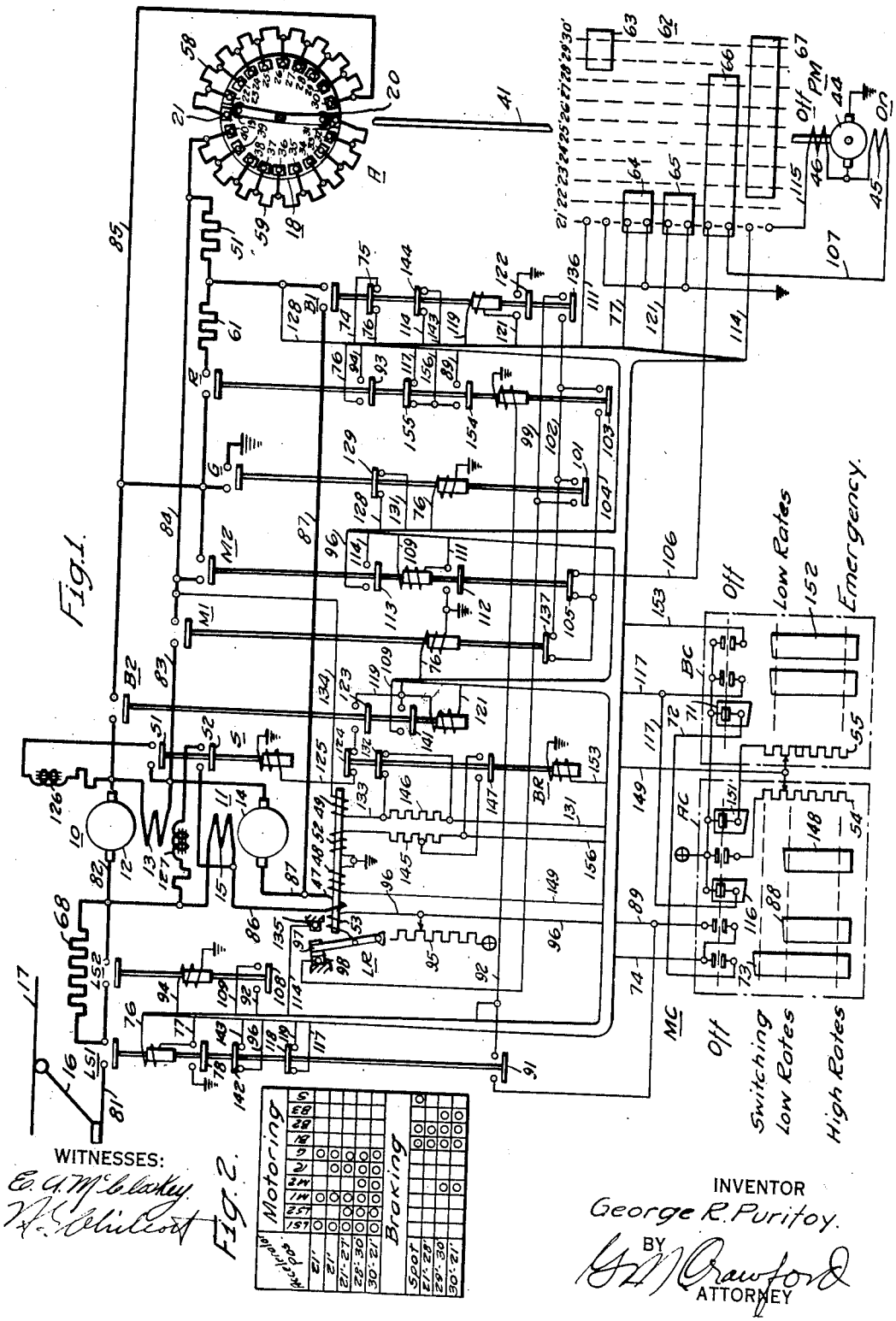

2,318,332

UNITED STATES PATENT OFFICE 2,318,332

MOTOR CONTROL SYSTEM

George R. Purifoy, Pittsburgh, Pa., assignor to Westinghouse Electric & Manufacturing Company, East Pittsburgh, Pa., a corporation of Pennsylvania Application May 13, 1942, Serial No. 442,764

8 Claims. (Cl. 172—179)

My invention relates, generally, to motor control systems and, more particularly, to systems for controlling the operation of the propelling motors of electric vehicles.

An object of my invention, generally stated, is to provide a control system for electrically propelled vehicles which shall be simple and efficient in operation and which may be economically manufactured and installed.

A more specific object of my invention is to provide for either manual or automatic control of an electrically propelled vehicle.

Another object of my invention is to provide for manually controlling the automatic progression of a control system of the accelerator type.

A further object of my invention is to synchronize the operation of a plurality of accelerators which are controlled from a single master controller.

Still another object of my invention is to provide a control system suitable for controlling either a single car or a plurality of cars operated in multiple-unit trains.

A still further object of my invention is to provide for smooth operation of an electrically propelled vehicle in unfavorable traffic conditions.

Other objects of my invention will be explained fully hereinafter or will be apparent to those skilled in the art.

In accordance with my invention, the acceleration of a vehicle is controlled by a motor-driven accelerator that normally progresses under the control of a current limit relay. Manual operation is obtained by utilizing a switching point on the master controller and so interlocking the progression switches that the accelerator may be held in any desired position, thereby permitting the vehicle to operate smoothly in slowly moving traffic.

For a fuller understanding of the nature and objects of my invention, reference may be had to the following detailed description, taken in conjunction with the accompanying drawing, in which:

Figure 1 is a diagrammatic view of a control system embodying my invention; and

Fig. 2 is a chart showing the sequence of operation of a portion of the apparatus illustrated in Fig 1.

Referring to the drawing, a pair of motors 10 and 11 may be utilized for propelling a vehicle (not shown). The motor 10 is provided with an armature winding 12 and a series-field winding 13. Likewise, the motor 11 is provided with an armature winding 14 and a series-field winding 15. A line switch LS1 is provided for connecting the motors 10 and 11 to a trolley 16 which engages a power conductor 17 that may be energized from any suitable source of power, such as a generating station (not shown).

The motors 10 and 11 are connected in parallel-circuit relation during acceleration of the vehicle. They may also be connected for dynamic braking with the field winding 15 of motor 11 connected across the armature 12 of motor 10 and the field winding 13 of motor 10 connected across the armature 14 of motor 11, thereby permitting the current in the armature windings to reverse and cause the motors to act as generators and decelerate the vehicle. A pair of switches B1 and B2 is provided for establishing the dynamic braking connections.

Both the acceleration and the deceleration of the motors 10 and 11 are primarily controlled by a motor driven accelerator A which is of the same general type as the one described in Patent No. 1,991,229 issued February 12, 1935 to L. G. Riley. The accelerator A comprises a circular bus 18 inside of which is disposed a plurality of contact fingers 21 to 40, inclusive, which are progressively forced against the bus 18 by a pair of revolving rollers 19 and 20.

The rollers 19 and 20 are driven by a pilot motor PM through a shaft 41. The pilot motor PM is provided with an armature winding 44 and two field windings 45 and 46, one for each direction of rotation of the motor. The energy for operating the pilot motor and the control apparatus may be supplied by a battery or other suitable source of control energy.

A limit relay LR is provided for controlling the operation of the pilot motor PM during both acceleration and deceleration of the vehicle. As shown, the relay LR is provided with several different actuating coils which function to operate the relay during coasting of the vehicle as well as during acceleration and dynamic braking. Thus, a series coil 47 is connected in the motor circuit during both acceleration and deceleration of the vehicle. A spotting coil 49 is connected across a resistor 51 to be energized in accordance with the motor current during coasting of the vehicle, thereby providing a means of spotting the accelerator A. A variable rate coil 48 is energized during acceleration of the vehicle and an additional rate coil 52 is energized during coasting and dynamic braking for controlling the accelerating and braking rates. The relay LR is also provided with a tickler coil 53 which functions to cause a vibratory action of the relay in a manner well known in the art.

In order to provide for changing the setting of the relay LR, thereby governing the rate of acceleration of the vehicle by varying the speed of the pilot motor PM, which, in turn, controls the rate at which resistance is shunted from the motor circuit to vary the motor current, variable resistors 54 and 55 are connected in the energizing circuit for the rate coil 48. The resistors 54 and 55 are varied by means of a master controller MC which may be divided into two sections, one designated AC, which is utilized during acceleration of the vehicle, and the other designated BC, which is utilized during dynamic braking of the vehicle. Since the controller is operated by the operator of the vehicle, the accelerating and braking rates may be varied by the operator as desired.

The accelerator A is provided with resistors 58 and 59 for controlling the current in the motors 10 and 11. The resistor 58 is divided into a number of subdivisions which are connected to the contact fingers 21 to 30, inclusive, and the resistor 59 is divided into subdivisions which are connected to the contact fingers 31 to 40, inclusive. In the present system, the resistors 58 and 59 are connected in the motor circuit in series circuit relation during both acceleration and dynamic braking, thereby making it unnecessary to change the resistor connections when transferring from motoring to braking operation.

As described in Patent No. 2,254,911, issued September 2, 1941 to L. G. Riley, a resistor 51 and an additional resistor 61 are connected in the motor circuit in parallel-circuit relation to the resistors 58 and 59 during the motoring operation. Since part of the motor current is diverted through the resistors 51 and 61, the heating effect on the accelerator is reduced and also arcing of the contact fingers on the accelerator is reduced.

As shown, the accelerator A is provided with a drum switch 62 having a plurality of contact segments 63 to 67, inclusive, and cooperating contact fingers which engage the contact segments as the accelerator is driven by the shaft 41. The reference numerals 21' to 30' indicate the contact fingers over which the roller 19 travels, while the contact segments are engaged by their respective contact fingers. It will be seen that the roller 20 travels over fingers 31 to 40 while the roller 19 travels over fingers 21 to 30. The function of the different segments of the drum switch 62 will be explained more fully hereinafter.

In addition to the accelerator and the control switches previously mentioned, numerous other switches are provided and perform certain switching operations. These include a switch LS2 for shunting a resistor 68 from the motor circuit, a switch M1 for connecting the motors to the accelerator during acceleration of the vehicle, a switch G for connecting the accelerator resistors to ground during acceleration, a switch M2 for connecting the motors directly to ground through the switch G after the accelerator resistors have been shunted from the motor circuit by the accelerator rollers, a switch R for connecting the resistors 51 and 61 in the motor circuit during acceleration, as previously described, and a field shunting switch S having contact members S1 and S2 for shunting the field windings 13 and 15, respectively.

In order to permit the present system to be utilized on cars which are operated in multiple unit trains and controlled from one control station at the head of the train, a braking relay BR is provided. The relay BR permits dynamic braking to be established simultaneously on all the cars of the train. The energization of the relay BR is controlled by the braking controller BC which may also be utilized to control the air brake system (not shown). Thus when the braking controller at the head of the train is operated, all of the relays BR throughout the train are energized to permit dynamic braking to be established on all the motors of the train. The controllers AC and BC are electrically interlocked to prevent improper operation of the equipment.

In order to permit either manual or automatic operation of the accelerator A, interlocks are provided on the switch R for so controlling the operation of the pilot motor PM that the accelerator may be stopped and held on any position by operating the switch R which is controlled by the accelerating controller AC. Thus, the controller AC is provided with a switching position and the variable rate positions.

When the controller is actuated to the switching position, the switches LS1, M1 and G are closed to connect the motors to the power circuit in series circuit relation with the resistors 58 and 59 of the accelerator A and also in series circuit relation with the resistor 68. At this time, the accelerator A will remain in its initial position. After the car has started moving and the rate of acceleration is to be increased, it is only necessary to actuate the controller to one of the rate positions, thereby closing the switch R to connect the resistors 51 and 61 in parallel-circuit relation to the motors and also closing the switch LS2 to shunt the resistor 68 from the motor circuit. The closing of the switch R causes the accelerator to rotate, as the pilot motor is energized through interlocks provided on the switch R, as will be described more fully hereinafter.

If it is desired to stop and hold the accelerator on any given position, the controller AC is returned to the switching position, thereby opening the switch R to deenergize the pilot motor and stopping the accelerator at the desired position. The opening of the switch R also slightly increases the total resistance in the motor circuit to provide a cushioning effect on the motors, thereby providing smoother operation of the vehicle.

Thus, by opening and closing the switch R, the accelerator is caused either to progress or to hold. If automatic acceleration is desired, it is only necessary to actuate the controller to any desired rate position and the progression of the pilot motor will be under the control of the limit relay LR. The foregoing feature is particularly desirable when operating a vehicle through congested traffic areas which require that the acceleration of the vehicle be interrupted frequently. Furthermore, the slight increase in the resistance in the motor circuit caused by the opening of the switch R and the switch LS2, in the foregoing manner, prevents jerking or jumping of the cars during acceleration as the progression of the accelerator is stopped at a desired running speed.

In order that the functioning of the foregoing apparatus may be more clearly understood, the operation of the system will now be described in more detail. As explained hereinbefore, power may be applied to the motors 10 and 11 by actuating the controller AC to the switching position, thereby closing the switches LS1, M1, and G to connect the motors to the power source. The energizing circuit for the actuating coil of the switch LS1 may be traced from positive through a contact segment 71 of the controller BC, conductor 72, a contact segment 73 of the controller AC, conductor 74, an interlock 75 on the switch B1, conductor 76, the actuating coil of the switch LS1, conductor 77, and the contact segment 64 of the drum switch 62, to ground. Following the closing of the switch LS1, a holding circuit for the coil of the switch is established through an interlock 78 on the switch LS1. The energizing circuit for the actuating coil of the switch M1 extends from the conductor 76 through the actuating coil of the switch M1 to ground and the energizing circuit for the coil of the switch G also extends from the conductor 76 through the coil of the switch G to ground.

The closing of the switch LS1, M1, and G connects the motors to the power source through a conductor 81, the switch LS1, the resistor 68, conductor 82, the armature winding 12 and the series field winding 13 of the motor 10, conductor 83, the switch M1, conductor 84, the resistor 59 of the accelerator A, the bus 18, the resistor 58, conductor 85, and the switch G to the ground. The circuit through the motor 11 extends from the conductor 82 through the series field winding 15, conductor 86, the series coil 47 of the limit relay LR, conductor 87, the armature winding 14, conductor 83, the switch M1, and thence through the accelerator A and the switch G to ground through a circuit previously traced.

As explained hereinbefore, the motors 10 and 11 operate at a relatively slow speed since all of the accelerator resistance remains connected in the motor circuit. If it is desired to increase the speed of the motors, the controller AC is actuated to one of the rate positions, depending upon the rate of acceleration desired. When the controller AC is actuated to one of the rate positions, the switch R is closed to connect the resistors 51 and 61 in parallel-circuit relation to the resistors of the accelerator A, thereby reducing the duty imposed upon the accelerator and also making it possible to connect the resistors 58 and 59 of the accelerator in series circuit relation during motoring as well as during dynamic braking. The energizing circuit for the actuating coil of the switch R may be traced from a contact segment 88 of the controller AC through conductor 89, an interlock 91 on the switch LS1, conductor 92, and the actuating coil of the switch R to ground.

Following the closing of the switch R, the switch LS2 is closed to shunt the resistor 68 from the motor circuit. The energizing circuit for the actuating coil of the switch LS2 extends from the conductor 76 through an interlock 93 on the switch R, conductor 94, and the actuating coil of the switch LS2 to ground.

As explained hereinbefore, the closing of the switch R also establishes a circuit for energizing the pilot motor PM to advance the accelerator A, the pilot motor being under the control of the limit relay LR, which, as explained hereinbefore, is responsive to the motor current. The energizing circuit for the pilot motor may be traced from positive through a resistor 95, a conductor 96, the tickler coil 53, contact members 97 and 98 of the relay LR, conductor 99, an interlock 101 on the switch G, conductor 102, an interlock 103 on the switch R, conductor 104, an interlock 105 on the switch M2, conductor 106, the contact segment 66 of the drum switch 62, conductor 107, the "on" field winding 45 and the armature winding 44 of the motor PM to ground.

As explained hereinbefore, the motor PM advances the accelerator A under the control of the limit relay LR unless the controller AC is returned to the switching position to deenergize the actuating coils of the switches R and LS2, thereby causing these switches to open. The opening of the switch R opens the interlock 103 carried by this switch, thereby deenergizing the pilot motor PM independently of any action of the limit relay LR. Accordingly, the pilot motor PM is stopped and the accelerator A will remain in the position in which it was at the time of the opening of the switch R until the controller AC is actuated to a rate position to reclose the switch R, at which time the accelerator will continue to advance under the control of the limit relay.

The opening of the switch R opens the parallel circuit through the resistors 51 and 61, thereby slightly increasing the total resistance in the motor circuit. Likewise, the opening of the switch LS2 increases the resistance in the motor circuit by reinserting the resistor 68 in series with the motors 10 and 11. When these switches are reclosed, the resistors 51, 61 and 68 are reconnected in the motor circuit in the manner hereinbefore explained. In this manner, the vehicle may be held at any desired speed when operating through traffic and a smoother operation of the vehicle is obtained by the cushioning action of the foregoing resistors in the motor circuit.

When the accelerator A nears the end of its travel in a forward direction, the switch M2 is closed to connect the motors 10 and 11 directly to the ground. The energizing circuit for the actuating coil of the switch M2 may be traced from the previously energized conductor 92 through an interlock 108 on the switch LS2, conductor 109, the actuating coil of the switch M2, conductor 111 and the contact segment 63 of the drum switch 62 to ground. A holding circuit for the coil of the switch M2 is established through an interlock 112 carried by the switch.

The closing of the switch M2 connects the motors 10 and 11 directly to ground through the switch G, thereby permitting the accelerator A to be returned to its initial position in preparation for an establishment of the dynamic braking circuit for the motors. The closing of the switch M2 also opens its interlock 105 thereby interrupting the energizing circuit for the pilot motor PM, which operated the motor in the forward direction. Furthermore, the closing of the switch M2 energizes the "off" field winding 46 of the pilot motor, thereby causing it to operate in the reverse direction to return the accelerator A to its initial position. At this time the energizing circuit for the pilot motor may be traced from positive through the resistor 95, conductor 96, an interlock 113 on the switch M2, conductor 114, the contact segment 67 of the drum switch 62, conductor 115, the "off" field winding 46 and the armature winding 44 of the motor PM to ground.

If it is desired to permit the vehicle to coast, the motors 10 and 11 may be disconnected from the power source by actuating the controller AC to the off position, thereby deenergizing the actuating coils for the switches LS1, LS2, M1, M2, R and G. When the controller AC is returned to the off position, the switches B1, B2 and S are closed to establish a dynamic braking circuit for the motors provided the accelerator A has returned to its initial position to insert the full amount of its resistance in the motor circuit.

In this manner, a small amount of current is permitted to circulate through the motors during coasting of the vehicle, as described in Patent 2,078,684, issued April 27, 1937, to L. G. Riley. However, the circulating current is of such a low value that it does not materially affect the coasting characteristics of the vehicle. The energizing circuit for the actuating coil of the switch B1 may be traced from positive through a contact segment 116 of the controller AC, conductor 117, an interlock 118 on the switch LS1, conductor 119, the actuating coil of the switch B1, conductor 121 and the contact segment 65 of the drum switch 62 to ground. The energizing circuit for the actuating coil of the switch B2 extends from the conductor 119, through the actuating coil of the switch B2, conductor 121, and the segment 65 to ground. A holding circuit for the switches B1 and B2 is established through an interlock 122 carried by the switch B1. The energizing circuit for the switch S extends from the conductor 119 through an interlock 123 on the switch B2, contact members 124 of the relay BR, conductor 125 and the actuating coil of the switch S to ground.

As explained hereinbefore, the closing of the switch S shunts the field windings 13 and 15 of the motors 10 and 11, respectively, through field shunts 126 and 127 thereby reducing the field strength of the motors to reduce the current generated by the motors. During coasting, the generated current is maintained at a relatively low value by the action of the accelerator A which is under the control of the limit relay LR during coasting, the relay LR being operated by the spotting coil 49 which is connected across the resistor 51 which is in the motor circuit at this time. The spotting coil 49 is designed to operate the relay at a relatively low value of current. The energizing circuit for the spotting coil may be traced from one terminal of the resistor 51 through conductor 128, an interlock 129 on the switch G, conductor 131, contact members 132 of the relay BR, conductor 133, the spotting coil 49, and conductors 134 and 84 to the other terminal of the resistor 51.

Since the current generated by the machines 10 and 11 during coasting is proportional to the speed of the vehicle, this current may be utilized for spotting the accelerator A, that is matching the position of the accelerator with the speed of the vehicle, thereby insuring that the accelerator will be in the proper position for the utilization of dynamic braking to decelerate the car. As previously explained, the accelerator is under the control of the limit relay LR during coasting. The contact members of the limit relay are so connected in the circuit for the pilot motor that the motor may be operated in either direction depending upon the speed of the car.

Thus, with the contact members 97 and 98 closed the pilot motor advances the accelerator to decrease the resistance in the motor circuit until the point is reached at which the motor current is sufficient to operate the relay LR to open the contacts 97 and 98. Should the car decrease in speed, which would result in lower motor current, the contact members 97 and 98 are closed to further advance the accelerator.

However, should the car increase in speed during coasting, resulting in a sufficient increase in the motor current to cause the contact member 97 to engage a contact member 135 on the relay LR, the pilot motor will be operated in the reverse direction to return the accelerator towards its initial position, thereby increasing the resistance in the motor circuit and matching the position of the accelerator with the speed of the car. The circuit for forward operation of the pilot motor may be traced from positive through the resistor 95, conductor 96, tickler coil 53, contact members 97 and 98, conductor 99, an interlock 136 on the switch B1, conductor 102, an interlock 137 on the switch M1, conductor 104, the interlock 105 on the switch M2, conductor 106, a segment 66 on the drum switch 62, conductor 107, the "on" field winding 45 and the armature winding 44 to ground. The circuit for reverse operation extends from the contact member 135 of the relay LR through conductor 114, the segment 67 of the drum 62, conductor 115, the "off" field winding 46 and the armature winding 44 to ground.

As fully described and claimed in my copending application Serial No. 442,763, filed May 13, 1942, the switch M2 is utilized to permit operation of the accelerator during coasting and braking, but to prevent its advancement while the vehicle is standing still. When the accelerator nears the end of its travel in a forward direction during either coasting or braking, the switch M2 is closed and, as explained hereinbefore, the operation of the switch M2 opens its interlock 105 to interrupt the energizing circuit for the "on" field of the pilot motor and closes its interlock 113 to establish an energizing circuit for the "off" field of the pilot motor, thereby returning the accelerator to its initial position. During coasting or braking, the energizing circuit for the actuating coil of the switch M2 is established from the previously energized conductor 119 through an interlock 141 on the switch B2 and conductor 109 to the actuating coil of the switch M2 and thence through the contact segment 63 of the drum switch 62 to ground, as described hereinbefore. Thus, the switch M2 is closed when the accelerator nears the end of its travel in a forward direction. If, for instance, the car has coasted to a stop after a light brake application, the accelerator roller will progress through the operation of the limit relay to cause the switch M2 to close in the manner hereinbefore described. The closing of the switch M2 causes the accelerator to be returned to the initial position and be held there for a reapplication of power. The same action takes place on all the cars of a multiple-unit train, thereby insuring that all accelerators are in the initial position for a reapplication of power.

In the event that both the controller AC and the controller BC are actuated to the off position, at any time during the operation of the vehicle, the pilot motor PM is operated in the reverse direction to return the accelerator to its initial position through interlocks provided on the switches LS1 and B1. The energizing circuit for the pilot motor may be traced from conductor 96, through an interlock 142 on the switch LS1, conductor 143, an interlock 144 on the switch B1, conductor 114, and thence to the "off" field winding of the pilot motor through a circuit previously traced.

In the event that dynamic braking is required to decelerate the vehicle, the controller BC is actuated to one of the braking positions, thereby energizing the relay BR to change the calibration of the rate coil 52 and the spotting coil 49. In this manner the limit relay LR is recalibrated for proper operation during dynamic braking. The rate coil 48 is normally energized through either the resistor 54 or the resistor 55, depending upon whether the vehicle is accelerating or braking and the rate coil 52 is energized through a resistor 145. The energizing circuit for the rate coil 52 extends from either the conductor 89 or the conductor 117 through either interlock 154 or 155 on the switch R and conductor 156 to the resistor 145.

As explained hereinbefore, the contact members 132 of the relay BR shunt a resistor 146 from the energizing circuit for the spotting coil 49 of the relay LR. The operation of the relay BR opens the contact members 132 to insert the resistor 146 in the circuit for the spotting coil and closes contact members 147 to shunt a portion of the resistor 145 from the circuit for the rate coil 52. The energizing circuit for the rate coil 48 may be traced from positive through either contact segment 148 and the resistor 54 to a conductor 149 or through contact segment 151 and the resistor 55 to the conductor 149, thence through the rate coil 48 to ground. The energizing circuit for the actuating coil of the relay BR may be traced from positive through a contact segment 152 of the controller BC, conductor 153, and the actuating coil of the relay BR to ground.

The operation of the relay BR also deenergizes the switch S, thereby removing the shunting circuits from the field windings for the motors 10 and 11, which increases the excitation of these motors and permits them to increase the braking current generated and causes an increase in the braking effect on the vehicle.

As explained hereinbefore, the accelerator is advanced under the control of the limit relay during dynamic braking, thereby controlling the braking current by varying the resistance in the motor circuit. The switch M2 is closed in the event that the accelerator is fully advanced, thereby shunting the resistors 58 and 59 from the motor circuit during dynamic braking in a manner similar to that during acceleration of the vehicle.

From the foregoing description, it is apparent that I have provided a system which is particularly suitable for controlling vehicles which must operate in congested traffic areas where it is necessary that further acceleration of the vehicle be prevented at certain times, but it is desirable to hold the speed attained by the vehicle. Since the present system provides for stopping and holding the accelerator in any desired position, it is evident that it accomplishes the foregoing result. Furthermore, it will be understood that the present system may be readily applied to the control of a plurality of vehicles operating in multiple-unit trains, the equipment on each vehicle being a duplicate of that illustrated and described.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, relay means responsive to the motor current for controlling the operation of the driving means, and means controlled by the master controller for controlling said driving means to control the functioning of the accelerator independently of said relay means.

2. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator the resistance in one direction to decrease the resistance in the motor circuit and in the opposite direction to increase the resistance in the motor circuit, relay means responsive to the motor current for automatically controlling the operation of the driving means, and means controlled by the master controller for controlling said driving means to stop and hold the accelerator in any desired position independently of said relay means.

3. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, and means on the master controller cooperating with means on said additional switching means for controlling said driving means to stop and hold the accelerator in any desired position.

4. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, means on the master controller for controlling the operation of said additional switching means, and means controlled by said additional switching means for controlling said driving means to stop and hold the accelerator in any desired position.

5. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, means on the master controller for controlling the operation of said additional switching means, and interlocking means actuated by said additional switching means for controlling said driving means to stop and hold the accelerator in any desired position.

6. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, relay means responsive to the motor current for controlling the operation of the driving means, and means on the master controller cooperating with means on said additional switching means for controlling said driving means to stop and hold the accelerator in any desired position independently of said relay means.

7. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, relay means responsive to the motor current for controlling the operation of the driving means, means on the master controller for controlling the operation of said additional switching means, and means controlled by said additional switching means for controlling said driving means to stop and hold the accelerator in any desired position independently of said relay means.

8. In a motor control system, in combination, a motor for propelling a vehicle, a power conductor, switching means for connecting the motor to the power conductor, a master controller for controlling the operation of said switching means, a variable resistance accelerator for controlling the motor current during acceleration of the vehicle, means for driving the accelerator, a fixed resistance, additional switching means for connecting the fixed resistance in the motor circuit, relay means responsive to the motor current for controlling the operation of the driving means, means on the master controller for controlling the operation of said additional switching means, and interlocking means actuated by said additional switching means for controlling said driving means to stop and hold the accelerator in any desired position independently of said relay means.

GEORGE R. PURIFOY.